United States Patent
Bode et al.

[11] Patent Number: 5,874,813
[45] Date of Patent: Feb. 23, 1999

[54] CONTROL METHOD, ESPECIALLY FOR LOAD BALANCING OF A PLURALITY OF ELECTROMOTOR DRIVES

[75] Inventors: Thorsten Bode; Jürgen Bernhardt, both of Düsseldorf, Germany

[73] Assignee: SMS Schloemann-Siemag AG, Dusseldorf, Germany

[21] Appl. No.: 891,583

[22] Filed: Jul. 11, 1997

[30] Foreign Application Priority Data

Aug. 17, 1996 [DE] Germany .................. 196 33 213.3

[51] Int. Cl.$^6$ .......................................... H02P 1/54
[52] U.S. Cl. .............................. 318/98; 318/99
[58] Field of Search .............. 318/98–100, 45–47, 318/66–85

[56] References Cited

U.S. PATENT DOCUMENTS

| | | | |
|---|---|---|---|
| 3,774,092 | 11/1973 | Messervey et al. | 318/99 |
| 3,845,366 | 10/1974 | Metzler et al. | 318/99 |
| 3,886,417 | 5/1975 | Niwa | 318/98 X |
| 3,991,349 | 11/1976 | Watson et al. | 318/84 |
| 4,056,759 | 11/1977 | Mitsui et al. | 318/98 |
| 4,292,572 | 9/1981 | Ivy | 318/52 |
| 4,357,561 | 11/1982 | Fencl | 318/98 X |
| 4,885,698 | 12/1989 | Kawasaki | 318/98 X |
| 5,210,473 | 5/1993 | Backstrand | 318/99 |
| 5,625,262 | 4/1997 | Lapota | 318/98 X |
| 5,708,332 | 1/1998 | Bottger et al. | 318/99 X |

FOREIGN PATENT DOCUMENTS

| | | |
|---|---|---|
| 61-295597 A | 12/1986 | Japan . |
| 01-060289 A | 3/1989 | Japan . |
| 699 641 A | 11/1979 | U.S.S.R. . |
| 1 184 065 A | 10/1985 | U.S.S.R. . |
| 1 617 613 A | 12/1990 | U.S.S.R. . |

*Primary Examiner*—Brian Sircus
*Attorney, Agent, or Firm*—Herbert Dubno

[57] ABSTRACT

A load-balancing method for a multiplicity of controlled drives, especially individual electric motors of the rolls of a leveling machine for metal strip, in which all of the motors have speed and current-control circuits and are interconnected by a superordinate memory programmable computer or controller. A respective load-balancing controller, preferably of the PI type, is provided between the computer and the input to the current controller to vary the current setpoint signal supplied to the latter by the speed controller in each system.

14 Claims, 2 Drawing Sheets

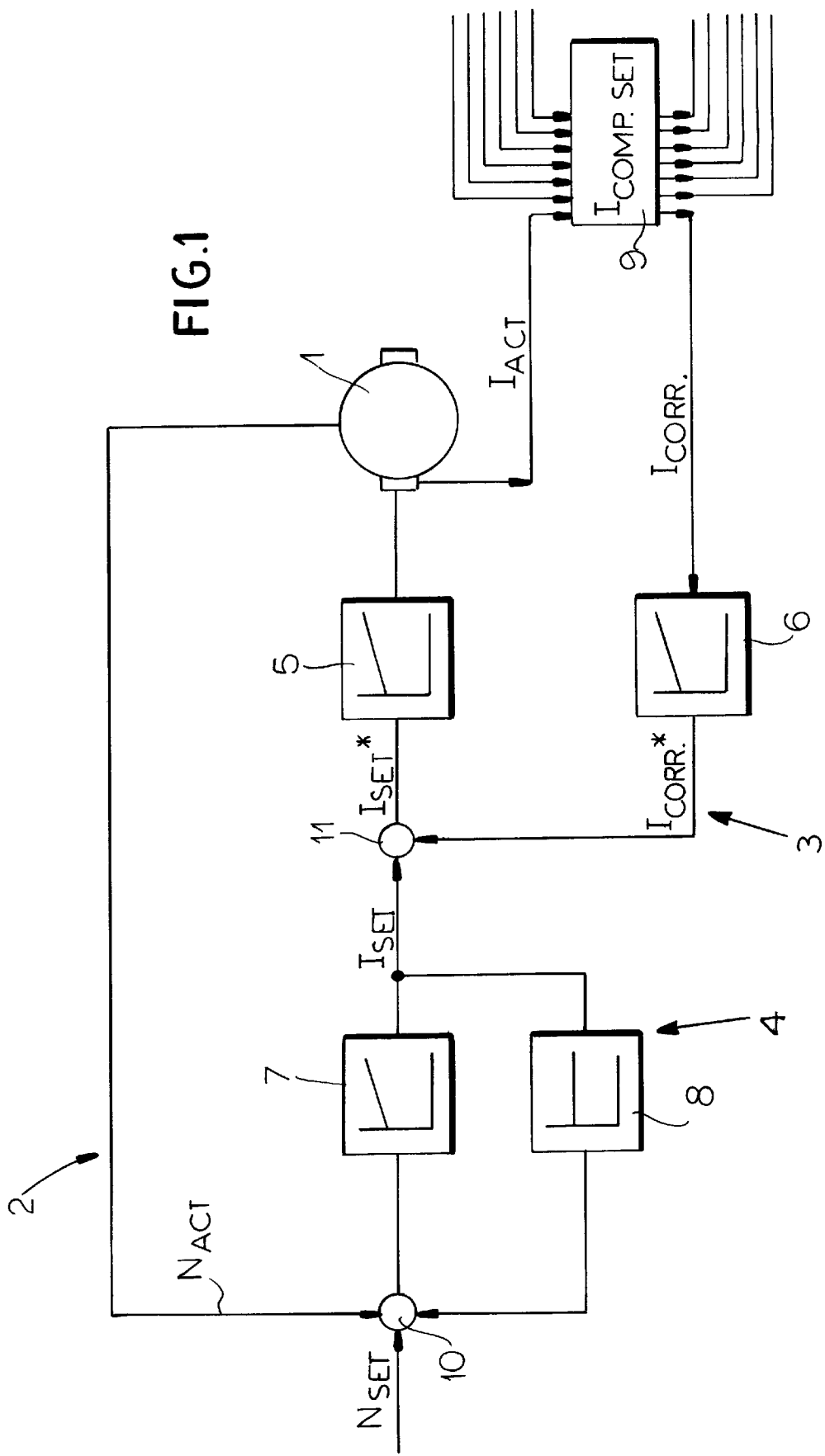

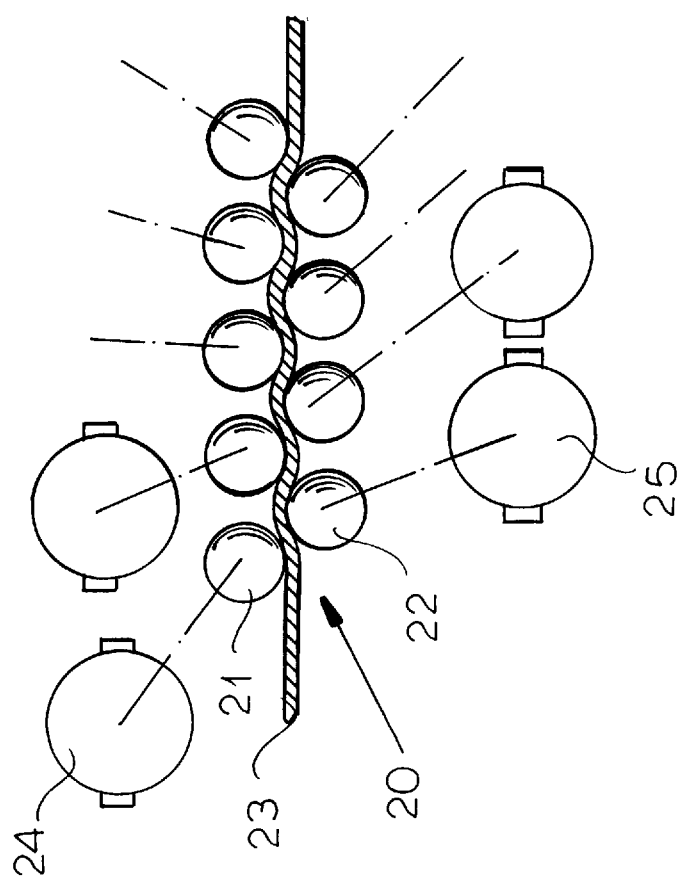

CONTROL METHOD, ESPECIALLY FOR LOAD BALANCING OF A PLURALITY OF ELECTROMOTOR DRIVES

FIELD OF THE INVENTION

Our present invention relates to a control method for load balancing of a plurality of controlled, electromotor drives and, more particularly, for the drives of individual leveling rolls of a roll-type leveling machine for the leveling of metal strip or the like, but also suitable for use in other systems in controlling a plurality of electric motors where load balancing is desirable. The invention especially is related to a hierarchical system of control wherein individual controls are provided for the respective motors, e.g. feedback control, and a superordinate automating controller, computer or the like is provided for the entire group of electromotors for which load balancing is to be effected.

BACKGROUND OF THE INVENTION

When a controlled drive system is referred to herein, we mean to indicate a drive system having an electric motor which can be provided with a feedback type of control. When a plurality of controlled drive systems are used to distribute a driving force onto a common element, as is the case for example in a metal strip processing line, the drives for individual rolls of a leveling machine, twin-drive roll stands, apparatus for fabricating or processing textile and paper and the like, to avoid an asymmetric load distribution upon the individual drive system and the detrimental effect this may have upon the drive systems and the workpiece, it is desirable to effect a load balancing.

For example, the asymmetric load distribution can be compensated by a control process in which the difference between the armature currents of two successive drives produces a signal which is used, in turn, to reduce the speed setpoint in the speed control circuit of the more strongly loaded drive to thereby bring about a load balancing. This form of load balancing is based upon a cascade regulation system, i.e. each pair of drives successively along the workpiece produces such a difference signal and that difference signal is used to reduce the speed setpoint of the more strongly loaded drive of the pair. The signal for load balancing must first be compared to an output from the slower speed controller and then supplied to the current controller. This has the drawback that the load-balancing system operates with relatively high inertia, i.e. cannot respond rapidly to load fluctuations. Such a load-balancing system is not suitable for machines with high dynamic requirements as is the case, for example, with metal strip leveling in a roller-type leveling machine wherein individual drives are provided for the leveling rollers.

OBJECTS OF THE INVENTION

It is, therefore, the principal object of the present invention to provide an improved load-balancing system whereby the aforedescribed drawbacks can be avoided.

More specifically, it is an object of the invention to provide an improved load-balancing method, particularly suitable for the multiplicity of drives of the individual rolls of a metal-strip leveling machine which can achieve load balancing with a minimum of inertia, i.e. with a significantly improved response time.

SUMMARY OF THE INVENTION

These objects and others which will become apparent hereinafter are achieved, in accordance with the invention, in that for the separate current-control and speed-control circuit of each drive, where a superordinate controller (e.g. a programmable controller) is provided for all of the drives, a respective load balancing controller is included. This can act directly upon the current controller in an advantageous manner to enable the system to respond to the high dynamic requirements. The additional load-balancing controller permits the actual momentum situation of each drive to be individually varied by ensuring the current setpoint modification of the respective drive through this load-balancing controller individual to that drive. As a result, each individual drive has its own load-balancing controller which enables a predetermined load distribution over all of the results of a metal-strip leveling machine, for example, to be maintained as preset. Furthermore, the load-balancing control permits not only the desired load distribution but also the momentum overload peaks, which result as the leading edge of the strip is fed into the apparatus and engages the roll, to be compensated.

According to a feature of the invention, the input signal of the load-balancing controller is formed from the difference between the signal representing the actual current $I_{act}$ and a setpoint value $I_{comp.set}$, whereby the $I_{comp.set}$ is calculated from the momentum distribution factor $K_i$ and the maximum arising current $I_j$. For each individual drive, the actual current (armature current) $I_{act}$ is measured and fed to the superordinate automating unit, i.e. the common controller or computer, which can be a programmable microprocessor-based controller having a program and associated data stored in memory, which can compare that specific $I_{act}$ value with the setpoint for the proper momentum distribution over the drive system represented by $I_{comp.set}$, to generate a correction value $I_{corr.}$. The current correction value $I_{corr.*}$ is provided as an input signal to the respective load-balancing controller.

The setpoint value $I_{comp.set}$ is calculated from the formula:

$$I_{comp.set} = \frac{I_j}{K_i}$$

where i is the index for the respective drive, i.e. represents the number of the drive along the workpiece path, $I_j$ is the actual current value of the respective drive at its maximum for maximum loading of the particular drive when the setpoint momentum distribution is achieved and, $K_i$ ($\geqq 1$) is a distribution factor for the drives with reference to the drive having the greatest loading.

If a load distribution is desired in which the torques of the individual drives are to differ along the workpiece, each of the drives will have a different $K_i$ factor and thus each load-balancing controller will be associated with a different setpoint value $I_{comp.set}$.

Referring again to a leveling machine as an example, a load distribution is customarily set before the leveling process is commenced and is to be maintained during the leveling process. For this purpose, the superordinate controller is programmed to output setpoint values $I_{comp.set}$ which can be fixed or which can be selected from tables and/or interpolated, depending upon the particular requirements.

If it is assumed, for example and for purposes of explanation that there are three drives, 1, 2 and 3 and, for a particular purpose that drives 1 and 3 are each to receive half the load on drive 2, the computer calculates the setpoint values $I_{comp.set}$ for the drives 1 and 3 again to the above-mentioned formula so that the $I_j$ corresponds to the $I_{act}$ of the second drive and the $K_i$ factor is 2. The setpoint $I_{comp.set}$ for the second drive can be calculated utilizing $K_i=1$ or in a corresponding calculation.

According to a further feature of the invention, the load-balancing controller individual to the drive and added in accordance with the principles of the invention is a proportional integral controller with a proportional integral transfer function. Such a PI controller has highly dynamic properties and the correction signal $I_{corr.}$, not only increases proportionally but also is integrated before the correction signal is applied to the current control circuit. The control response is thereby greater so that the particular drive can be more quickly loaded or subjected to a load reduction in response to deviation from the desired loading.

According to another feature of the invention, the output signal of the load-balancing controller is applied to the current regulator of the respective current-control circuit. The output signal of the load-balancing controller which can be greater, less or equal to the setpoint current depending upon the load distribution and the actual loading can be supplied to an adder between the output of the speed controller and the input of the current controller. The current setpoint can derive from the speed controller.

It has been found to be advantageous, moreover, to provide each of the speed-control circuits of the respective drives with a proportional feedback of the speed controller. The output signal of the speed controller, which by comparison to the load-balancing controller is dominant, can thereby be limited in that the output signal of the speed controller is fed back proportionally between 0 to 25% to the input. The load-balancing controller thus does not have to operate at a control limit which will allow a control deviation to remain. Indeed, the control deviation on load balancing can be reduced to 0 and the reliability of the load distribution thereby enhanced by the method of the invention.

The method of the invention thus can comprise the steps of:

(a) providing for each of the drives a respective speed-control feedback circuit and a respective current-draw feedback control circuit and generating a respective load-responsive parameter in at least one of the circuits indicative of loading of the respective drive;

(b) monitoring the load-responsive parameters of all of the drives in a hierarchically superordinate controller by comparing the respective load-responsive parameters with a setpoint value of the respective load-responsive parameter assigned to the respective drive and chosen to balance loading of the drives, and generating a corrected parameter for each drive based upon the comparison; and (c) applying the corrected parameter through a fixed-transfer-function load-compensating controller as an actual-value input to one of the feedback circuits of the respective drive.

In terms of the system, the latter can comprise:

a respective speed control feedback circuit and a respective current-draw feedback control circuit for each of the drives including means in at least one of the circuits for generating a respective load-responsive parameter indicative of loading of the respective drive;

a hierarchically superordinate controller receiving the respective load-responsive parameter from all of the drives for comparing the respective load-responsive parameters with setpoint values of the respective load-responsive parameter assigned to the respective drive and choosing the balance loading of the drives, and generating a corrected parameter for each drive based upon the comparison; and a fixed-transfer-function load-compensating controller connected to the superordinate controller and receiving the respective corrected parameter therefrom for applying the corrected parameter as an actual-value input to one of the feedback circuits of the respective drive.

In the system of the invention, therefore, the speed controller, which has been dominant in earlier control systems, is subordinate to the programmable controller and the current controller is subordinate to the speed controller.

BRIEF DESCRIPTION OF THE DRAWING

The above and other objects, features, and advantages will become more readily apparent from the following description, reference being made to the accompanying drawing in which:

FIG. 1 is a block diagram illustrating a control system according to the invention; and FIG. 2 is a diagram showing application of that system to a metal strip leveling machine.

SPECIFIC DESCRIPTION

The invention is applicable to, for example, a strip-leveling machine 20 which, as shown in FIG. 2, can comprise a multiplicity of rolls 21, 22, engageable with the strip 23 from opposite sides and provided with respective drives 24, 25, etc., each including an electric motor 1 (FIG. 1) with its individual control circuits 3 and 4 and all of which are connected in a load balancing control circuit 2 (FIG. 1) described in greater detail hereinafter.

Each of the electric motors 1 can have a separate current control circuit 3 and a speed-control circuit 4. The current-control circuit 3 comprises a current controller 5 which may be of the proportional or proportional-integral type and a load-balancing controller 6 which is of the PI type previously described.

The speed-control circuit 4 comprises a speed controller 7 which may also be of the PI type and a proportional feedback unit 8 connected in parallel to the controller 7.

An actual current pickup $I_{act}$ from each motor, which can represent the respective current through the armature thereof, serves as an input signal for a superordinate memory programmable computer or controller 9 shown as a black box which receives corresponding inputs from all of the drives 24, 25, etc. The memory programmable controller 9 generates for each drive a setpoint $I_{comp.set}$ which can be referred to as a compensating setpoint (selected from memory based upon previous calculation for example or calculated as needed from data in memory) originally calculated by the aforedescribed formula and establishing the setpoints for the desired load distribution over the entire set of drives.

In the computer 9, the respective setpoint values $I_{comp.set}$ are compared with each actual current $I_{act}$ and from the resulting comparison, a correction current signal $I_{corr.}$ is outputted and applied as an input to the load-balancing controller 9. Depending upon the desired load distribution, the correction current signal $I_{corr.}$ can be smaller, greater or equal to the setpoint current for the motor 1.

Because of the dynamics of the circuit, the load-balancing controller 9 of each drive-control system is a proportional integral (PI) controller so that the input signal $I_{corr.}$ is not only proportionally amplified but is correspondingly integrated as well. The output signal of the load-balancing controller 6, $I_{corr*}$ is applied to an adder 11, the output of which serves as the input to a current controller 5 which is also connected to the output of the speed controller 7.

The output from the speed controller 7 is a current-setpoint signal $I_{set}$ which is also fed to the adder 11 so that this setpoint value can be corrected by the correction signal $I_{corr*}$. Thus the setpoint $I_{set}$ is increased, reduced or not modified based upon the correction value $I_{corr*}$. The resulting setpoint signal $I_{set*}$ is then delivered to the current controller 5 which, in the preferred case, is also a proportional-integral controller.

The output signal $I_{set}$ from the speed controller 7 is fed back proportionally by the controller 8 to the input of the controller 7 between 0 and 25% via an adder 10 which also received an actual speed signal $N_{act}$ from a tachometer connected to the motor 1. An external input $N_{set}$ is provided as the setpoint speed to the adder 10 as well. The result is that the output signal from the speed controller 7 is limited at the upper part of its range and the dominance of the speed controller 7 by comparison to the load-balancing controller 6 is reduced so that the load-balancing controller 6 does not have to face a fixed control limit. The load distribution for the drive 1 can be regulated with a range which can extend from 0 and need not confront a fixed limit imposed upon the system by an invariable limit to the range of the speed controller 7.

We claim:

1. A method of load-balancing control for a plurality of controlled electromotor drives, comprising the steps of:
   (a) providing for each of said drives a respective speed-control feedback circuit and a respective current-draw feedback control circuit and generating a respective load-responsive parameter in at least one of said circuits indicative of loading of the respective drive;
   (b) monitoring the load-responsive parameters of all of said drives in a hierarchically superordinate controller by comparing the respective load-responsive parameters with a setpoint value of the respective load-responsive parameter assigned to the respective drive and chosen to balance loading of said drives, and generating a corrected parameter for each drive based upon the comparison; and
   (c) applying the corrected parameter through a fixed-transfer-function load-compensating controller as an actual-value input to one of the feedback circuits of the respective drive.

2. The method defined in claim 1 wherein an output signal from each of said fixed-transfer-function load-compensating controllers is fed to a current controller of the respective current-draw feedback control circuit.

3. The method defined in claim 1 wherein said corrected parameter is subjected to proportional-integral control in said fixed-transfer-function load-compensating controllers.

4. The method defined in claim 1 wherein the corrected parameter fed as an input signal to each of said fixed-transfer-function load-compensating controllers is a difference signal between an actual value current signal and a setpoint load-balancing current signal calculated from a moment-distribution factor ($K_i$) and a maximally arising current ($I_j$).

5. The method defined in claim 1 wherein for feedback control of speed of each drive, a speed controller is provided and is bridged by a proportional feedback loop.

6. The method defined in claim 5 wherein an output signal from each of said fixed-transfer-function load-compensating controllers is fed to a current controller of the respective current draw feedback control circuit.

7. The method defined in claim 6 wherein said corrected parameter is subjected to proportional-integral control in said fixed-transfer-function load-compensating controllers.

8. The method defined in claim 7 wherein the corrected parameter fed as an input signal to each of said fixed-transfer-function load-compensating controllers is a difference signal between an actual value current signal and a setpoint load-balancing current signal calculated from a moment-distribution factor ($K_i$) and a maximally arising current ($I_j$).

9. A load-balancing control system for a plurality of controlled electromotor drives comprising:
   a respective speed control feedback circuit and a respective current-draw feedback control circuit for each of said drives including means in at least one of said circuits for generating a respective load-responsive parameter indicative of loading of the respective drive;
   a hierarchically superordinate controller receiving the respective load-responsive parameter from all of said drives for comparing the respective load-responsive parameters with setpoint values of the respective load-responsive parameter assigned to the respective drive and choosing the balance loading of said drives, and generating a corrected parameter for each drive based upon the comparison; and
   a fixed-transfer-function load-compensating controller connected to said superordinate controller and receiving the respective corrected parameter therefrom for applying the corrected parameter as an actual-value input to one of the feedback circuits of the respective drive.

10. The load-balancing control system defined in claim 9 wherein said fixed-transfer-function load-compensating controller is a proportional-integral controller.

11. The load-balancing control system defined in claim 10 wherein said superordinate controller is a programmable controller with a memory.

12. The load-balancing control system defined in claim 11 wherein each of said current-draw feedback control circuits includes a current controller supplying electric current to a respective motor of said drive, means for tapping an actual value of said current from said motor and feeding said actual current to said superordinate controller as said load-responsive parameter, said superordinate controller providing a correction current as said corrected parameter to the respective fixed-transfer-function load-compensating controller and a correction current from said fixed transfer-function load-compensating controller being fed to an adder with a setpoint current, an output of said adder being connected to said current controller to supply an input thereto.

13. The load-balancing control system defined in claim 12 wherein each speed control feedback circuit includes a further adder supplied with a speed setpoint and with an actual speed value from said motor, and a speed controller connected to said further adder and generating said setpoint current.

14. The load-balancing control system defined in claim 13, further comprising a feedback loop including a proportional controller and connected between an output of said speed controller and said further adder.

* * * * *